United States Patent
Boxell et al.

(10) Patent No.: US 12,488,009 B2
(45) Date of Patent: Dec. 2, 2025

(54) RANKING SEARCH RESULTS BASED ON APPEASEMENT SIGNALS AND QUERY SPECIFICITY

(71) Applicant: Maplebear Inc., San Francisco, CA (US)

(72) Inventors: Levi Boxell, Brownsburg, IN (US); Vinesh Reddy Gudla, South San Francisco, CA (US); Michael Kurish, Perkasie, PA (US); Raochuan Fan, Sunnyvale, CA (US); Tilman Drerup, Palo Alto, CA (US); Tejaswi Tenneti, San Carlos, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/241,093

(22) Filed: Aug. 31, 2023

(65) Prior Publication Data

US 2025/0077529 A1   Mar. 6, 2025

(51) Int. Cl.
*G06F 16/2457* (2019.01)
*G06F 16/248* (2019.01)
*G06N 20/00* (2019.01)

(52) U.S. Cl.
CPC ...... *G06F 16/24578* (2019.01); *G06F 16/248* (2019.01); *G06N 20/00* (2019.01)

(58) Field of Classification Search
CPC .. G06F 16/24578; G06F 16/248; G06N 20/00
See application file for complete search history.

(56) References Cited

U.S. PATENT DOCUMENTS

| | | | |
|---|---|---|---|
| 8,370,319 B1 * | 2/2013 | Krynski | G06F 16/24578 709/227 |
| 11,625,644 B1 * | 4/2023 | Haramaty | G06F 16/9535 707/723 |
| 2005/0144052 A1 * | 6/2005 | Harding | G06F 16/954 705/26.1 |
| 2006/0085447 A1 * | 4/2006 | D'Urso | G06F 16/24578 |
| 2021/0082044 A1 * | 3/2021 | Sliwka | H04L 9/3255 |

* cited by examiner

*Primary Examiner* — Tony Wu
(74) *Attorney, Agent, or Firm* — Fenwick & West LLP

(57) ABSTRACT

An online system displays items to a user in search results based on appeasement scores for the items, adjusted according to how specific the search query is. The online system receives a search query from a user of an online system. The online system computes a query specificity score, a measure of the specificity of the search query. The online system accesses candidate items from a database that potentially match the search query. For each candidate item, the online system may compute or predict an appeasement score. The online system adjusts the appeasement score based on the query specificity score such that a more specific query weights the appeasement score lower than a less specific query. The online system may then compute a ranking score based on the adjusted appeasement score and display the candidate items to the user based on their ranking scores.

19 Claims, 5 Drawing Sheets

RANKING SEARCH RESULTS BASED ON APPEASEMENT SIGNALS AND QUERY SPECIFICITY

BACKGROUND

Online systems provide services to users that interact with the online systems through their user devices. For example, an online concierge system allows users to order items to be provided to them. Users may transmit search queries to the online concierge system. In response, the online concierge system provides the user with search results that are relevant to the user's search query, transmitting the results to the user's device for presentation to the user. Occasionally, after a user has placed an order, they may encounter issues with the items in the order. For example, items may be missing, incorrect, or damaged. In these cases, online concierge systems may provide ways for users to make appeasement requests, such as requests for a return or replacement of the items in the order.

Online systems may use appeasement request data to compute a score that represents a quality of an item or a likelihood that an item would cause an order to require an appeasement request. By presenting content based on these scores, online systems can steer users to items that are less likely to become problematic. However, overreliance on these metrics can hide items that users are specifically interested in interacting with. For example, if a user wants to order a particular item and that particular item happens to be likely to cause an appeasement request, an online system that too heavily weights appeasement rates in presenting content is likely to actually reduce user interaction rates with the system's content. Thus, online systems using appeasement request data to present content may fail to actually improve user interactions with content.

SUMMARY

In accordance with one or more aspects of the disclosure, an online system displays items to a user in search results based on appeasement scores for the items, adjusted according to how specific the search query is. In some embodiments, the online system receives a search query from a user of an online system, where the search query includes free text indicating items of interest to the user. The online system computes a query specificity score. A query specificity score represents a measure of the specificity of the search query. For example, an online concierge system may compute a low query specificity score for the search query "snacks" and a high query specificity score for the search query "organic cheddar cheese crackers." The online system computes the query specificity score based on the inverse of an entropy score. An entropy score is a score for a query that represents an uncertainty in interaction outcomes across items in the candidate set (e.g., an uncertainty in which item a user will select based on the query). The online system accesses candidate items from a database that potentially match the search query. The online system computes an appeasement score for each of the candidate items, in some embodiments predicting the appeasement score with a machine learning model. An item's appeasement score represents the likelihood that the user will request an appeasement action for an order if the user selects the item for their order. The online system adjusts the appeasement score based on the query specificity score such that a more specific query weights the appeasement score lower than a less specific query. The online system computes a ranking score based on the adjusted appeasement score and transmits the candidate items to a client device for display to the user based on their ranking scores.

Through balancing an appeasement score of an item with the item's relevance to a user-provided search query, the online system provides the user with search results where items are both relevant to what the user is searching for and less likely to involve issues. More specifically, the online system is using the query specificity score as a signal to represent a user's interest in a particular item rather than a category of items. Thus, these online systems are less likely to encounter the over-reliance issues described above that can occur when using appeasement request data to present content. Additionally, by using a machine learning model to predict the appeasement scores of items, the online system may be able to predict and prevent the occurrence of item issues before users encounter them.

DETAILED DESCRIPTION

Figure 1:
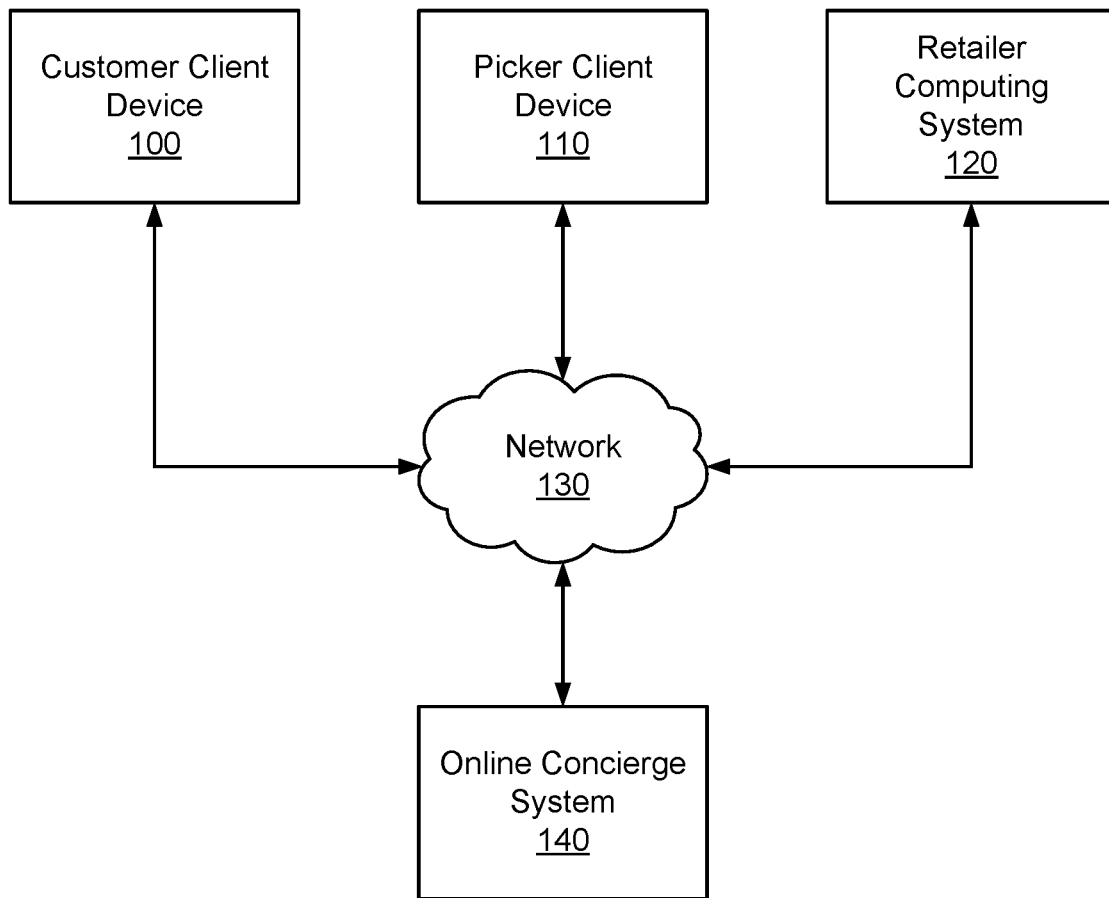
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
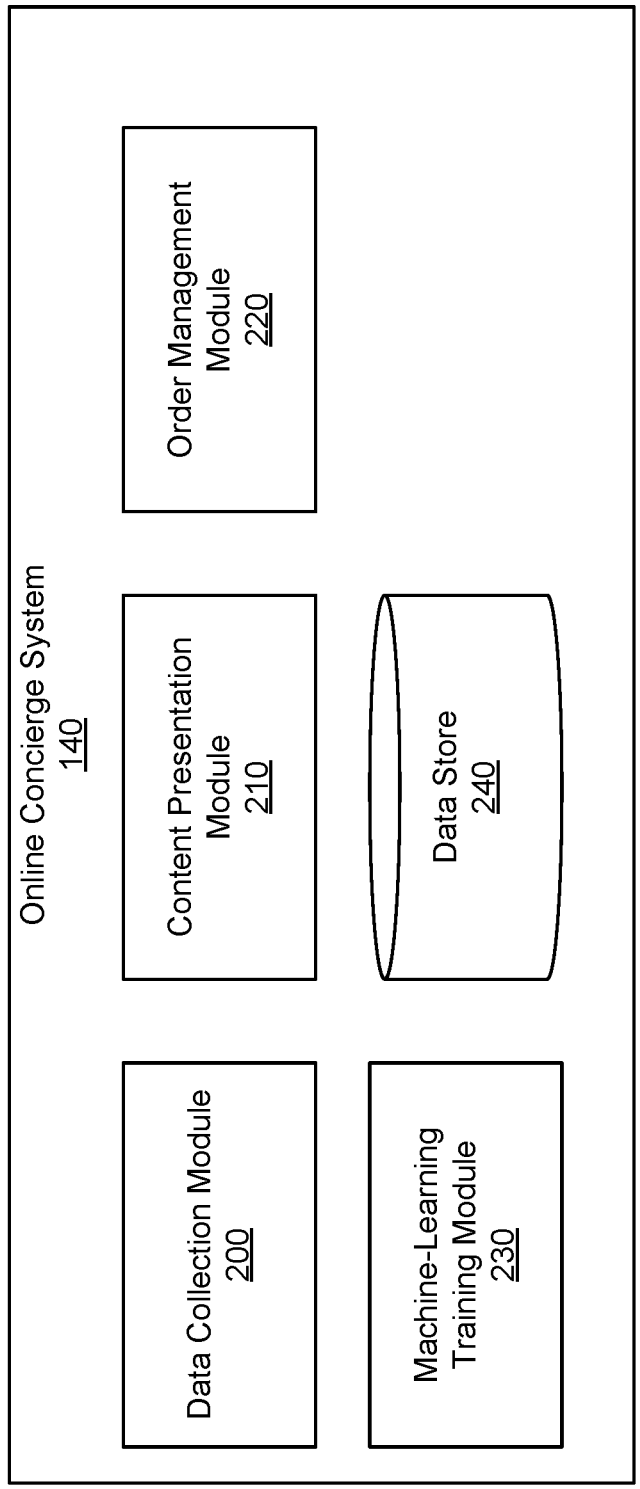
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items). Scores generated by the content presentation module 210 may be alternatively referred to herein as "base scores."

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

In some embodiments, the content presentation module 210 displays items to a customer based on appeasement scores for the items. An appeasement score represents the likelihood that the customer will request that the online concierge system 140 remedy an issue with their item or order. Appeasement scores may be based on item data, order data, customer data, or appeasement data, which may include item issue rates, refund rates, and replacement rates. In some embodiments, the content presentation module 210 receives a search query from a user of the online concierge system 140 and computes a query specificity score for the search query. The content presentation module 210 accesses a set of candidate items and computes an appeasement score for each candidate item in the set. The content presentation module 210 adjusts the appeasement score based on the query specificity score and computes a ranking score such that the ranking scores can be used to rank the candidate items against one another. The content presentation module 210 may display the candidate items based on their ranking scores. Further details of the method of displaying items are discussed in FIG. 3.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
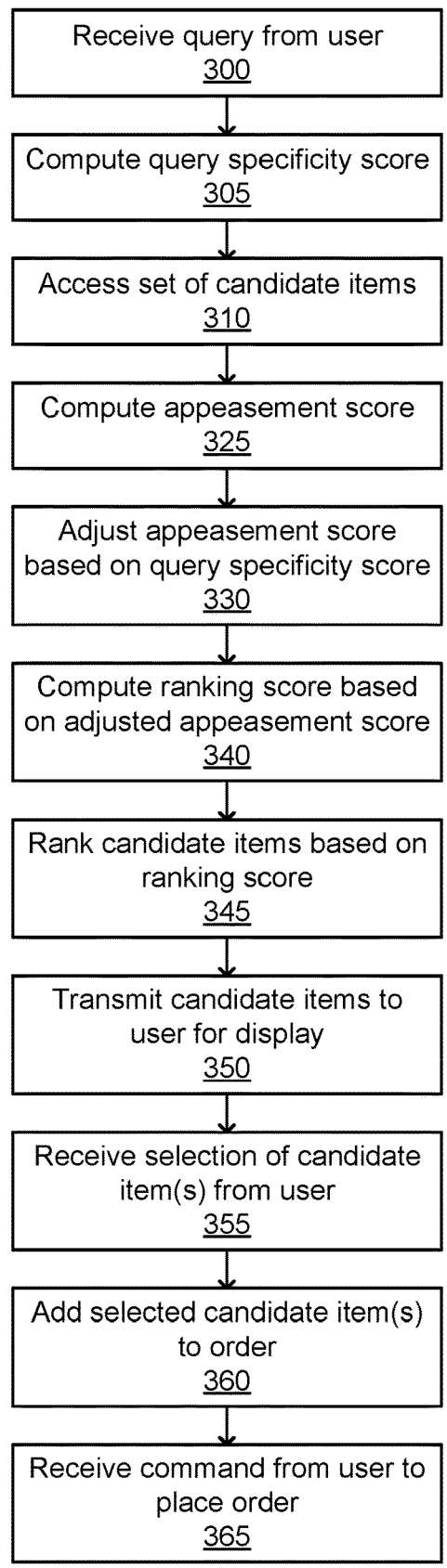
FIG. 3 illustrates a method of displaying items to a user based on appeasement scores for the items and a query specificity score of the search query, in accordance with one or more embodiments.

FIG. 3 is a flowchart illustrating a method of ranking items to a user based on appeasement scores for the items and a query specificity score of the query, in accordance with some embodiments. Alternative embodiments may include more, fewer, or different steps from those illustrated in FIG. 3, and the steps may be performed in a different order from that illustrated in FIG. 3. These steps may be performed by any online system, for example, online concierge system 140, an online social networking system, or a video content search system. Additionally, each of these steps may be performed automatically by the online system without human intervention.

The online concierge system 140 receives 300 a search query from the customer client device corresponding to the customer. A search query is free text that includes a set of words that indicate items of interest to the customer. For example, if a customer wants to be presented with sourdough bread items, the customer may provide "sourdough" or "sourdough bread" as free text for a search query. A search query may be associated with a particular retailer that a customer wishes the order to be from. In some embodiments, the search query includes customer data describing characteristics of the customer or item data describing characteristics of items that the customer has added to their shopping list. For example, the search query may include a customer identifier identifying the customer who generated the search query or item identifiers identifying the items added to the customer's shopping list.

The online concierge system 140 computes 305 a query specificity score for the search query. A query specificity score represents how specific or generic the search query is or represents an estimated breadth of the search query relative to a diversity of the item database. For example, the online concierge system may compute a lower query specificity score for a search query "snacks" than for a search query "organic cheddar cheese crackers." The search query "snacks" may be relevant to a greater breadth of products, and as such is less specific. The search query "organic cheddar cheese crackers" may be relevant to a smaller breadth of products, and as such is more specific. The online concierge system 140 may compute 335 the query specificity score based on different measures of specificity.

In some embodiments, the online concierge system 140 may compute the query specificity score of a search query at a particular retailer such that the broadness of the search term is evaluated relative to a diversity of the retailer's inventory. For example, for a search query "toothpaste," a grocery retailer may have only a few brands or options while a pharmacy retailer may have many brands or options for a customer to choose from. In this example, the online concierge system 140 may compute a higher query specificity score for the search query "toothpaste" at the grocery retailer than at the pharmacy retailer.

In some embodiments, the online concierge system 140 measures the specificity of a search query with a machine learning model trained on a set of example queries with manually labeled specificity values. In some embodiments, the online concierge system 140 measures the specificity based on the number of words included in the free-text of the search query or based on the length of the free-text of the search query.

In some embodiments, the online concierge system 140 computes 305 the specificity of a search query by computing an entropy score for the search query. The entropy score functions as an inverse measure of specificity for the search query and, as such, its inverse may be used as the query specificity score. The online concierge system 140 may compute the entropy score by computing, for a set of possible interaction outcomes from the search query, an uncertainty of which interaction outcomes may result. An interaction outcome is an outcome that represents an interaction between a customer and an item presented in search results for the search query. An uncertainty in interaction outcomes may be based on historical data, such as data describing which items customers with the same or similar queries have interacted with in the past, or data showing the rate at which customers have interacted with a particular item when it has been presented in response to a search query. For example, for a given search query, the online concierge system 140 may obtain data indicative of counts of historical conversions for each of a set of different items resulting from the search query as applied to an item database. The online concierge system 140 computes the entropy score using probabilities that a customer will interact with an item, given a search query, where the online concierge system 140 computes the probabilities based on historical data.

In some embodiments, the online concierge system 140 may compute the entropy score based on Equation 1, $$E = -\sum_i P(s) \log\log(P(s)) \quad \text{Eq. 1}$$

for all items i in a set of candidate items, where P(s) is given by Equation 2, $$P(s) = \frac{C(s)}{C(i)} \quad \text{Eq. 2}$$

where s is defined to be the item search query interaction. By using Equation 1, the online concierge system 140 computes the probability P(s) that, given a search query s, a customer will interact with an item. The online concierge system 140 computes P(s) by taking the number of times customers have interacted with the item based on the search query, C(s), and dividing it by the number of times the item has been offered as a result of the search query, C (i). C(s) may be referred to as an item conversion count for a specific item resulting from the search query. C (i) may be referred to as a total count of conversions resulting from the search query. The online concierge system 140 takes the log of the probability, log log (P(s)), and multiplies it by the probability itself, P(s). The overall term P(s) log log (P(s)) represents an item entropy for a specific item. The online concierge system repeats the computation across all candidate items, i, sums those computations, then uses the negative of the sum as the entropy score, E.

The online concierge system 140 accesses 310 a set of candidate items stored by the online concierge system 140. The set of candidate items are items that the online concierge system 140 considers for possible presentation to the customer as search query results. The online concierge system 140 may access the set of candidate items by accessing a set of items stored in data store 240. In some embodiments, the online concierge system 140 filters a broader set of items to generate the set of candidate items. For example, if the search query is searching for items at a particular retailer, the online concierge system 140 may filter out items that are not available at a retail location at which the order would be serviced.

The online concierge system 140 computes 325 an appeasement score for each candidate item in the set of candidate items. The appeasement score may represent the likelihood that the customer will make an appeasement request for the candidate item or the likelihood that an appeasement action will be applied to the candidate item. As such, the higher the appeasement score for an item, the more prone the item may be to issues (e.g., being damaged or missing). An appeasement request is a request from a customer for an appeasement action to be applied to an item in the customer's item. An appeasement action is an action the online concierge system 140 applies to remedy an issue that occurred with the user's item. Example appeasement actions include redelivering the item or refunding some or all of the cost of the item. For example, if an item is damaged, incorrect, or missing from the customer's order, the customer may submit an appeasement request and the online concierge system 140 may refund or replace the item.

The online concierge system 140 may compute the appeasement score for a candidate item based on appeasement data. Appeasement data may include the issue rate of the item (e.g., how often customers who ordered the item make an appeasement request), the refund rate of the item (e.g., how often the online concierge system 140 applies a refund appeasement action to the item), or the replacement rate of the item (e.g., how often the online concierge system 140 applies a replacement appeasement action to the item). The appeasement data and associated rates may correspond to a particular time window (e.g., the last year, month, week, etc.). In some embodiments, appeasement data for the candidate item may be different between different retailer locations. For example, if an item at one retailer location is difficult for a picker to find (e.g., on a crowded shelf, in a different spot than usual), the item may have a high issue rate. If the same item at another retailer location is easy for a picker to find, the item may have a low issue rate. As such, in some embodiments, the online concierge system 140 may compute the appeasement score for the candidate item at a particular retailer location.

The online concierge system 140 may compute the appeasement score by predicting the likelihood that an appeasement action will be applied for the candidate item. The online concierge system 140 may predict the likelihood by using a machine learning model trained to receive the candidate item as input and to output the likelihood that an appeasement action will be applied for the candidate item. In some embodiment, inputs may include item data for the candidate item, order data for an order that includes the candidate item, or customer data for the customer ordered the item. Training examples with which to train the machine learning model may include items labeled by appeasement data (e.g., the historical issue rate, refund rate, or replacement rate of the item). Computing the appeasement score with a machine learning model may be advantageous for situations when the candidate item lacks or has a low amount of appeasement data, which may make it difficult for the online concierge system 140 to compute the appeasement score based on appeasement data of the candidate item alone.

The online concierge system 140 adjusts 330 the appeasement score of the candidate item based on the query specificity score. The online system may adjust the appeasement score such that a more specific query weights the appeasement score lower than a less specific query. For example, for a given candidate item with an appeasement score, the online concierge system 140 may adjust the appeasement score to be lower when the search query has a higher query specificity score than when the search query has a lower specificity score. To use an example, say a candidate item "Cici's whole grain cereal mix" has an appeasement score of 0.5. Say customer A inputs a search query "Cici's cereal" and customer B inputs a search query "cereal." Customer A's search query, "Cici's cereal," is more specific than customer B's search query, "cereal." As customer A provided a more specific search query than customer B, they may have a better idea of the type or brand of cereal they want. As such, customer A may wish to order the item regardless of its appeasement score or be less sensitive to the appeasement score of the candidate item than customer B, who may wish to see other candidate items with higher appeasement scores. So, for customer A's search query "Cici's cereal," the online concierge system 140 may adjust the appeasement score of "Cici's whole grain cereal mix" from 0.5 to 0.4, a lower number. For customer B's search query "cereal," the online concierge system 140 may adjust the appeasement score of "Cici's whole grain cereal mix" from 0.5 to 0.6, a higher number. The online concierge system 140 may adjust the appeasement score by computing a product of the appeasement score and the query specificity score. Further details of adjusting the appeasement score based on the query specificity score are described with respect to FIG. 4B.

In some embodiments, the online concierge system may receive external logic and adjust the appeasement score based on the query specificity score and the external logic. External logic may include methods of combining the appeasement score and query specificity score or may include specific weights to apply to the scores. For example, the online concierge system may receive external logic in the form of experimentally determined weights and apply the experimentally determined weights to the scores.

In some embodiments, the online concierge system 140 may adjust the appeasement score based on an appeasement sensitivity of the customer. An appeasement sensitivity represents how likely the customer is to make an appeasement request compared to other customers. For example, a first customer that makes an appeasement request for one out of every five items may have higher appeasement sensitivity than a second customer that makes appeasement requests for one out of every twenty items. As such, the online concierge system 140 may adjust the appeasement scores for items presented to the first customer such that the resulting adjusted appeasement scores are higher than the unadjusted appeasement scores. Similarly, the online concierge system 140 may adjust the appeasement scores for items presented to the second customer such that the resulting adjusted appeasement scores are lower than the unadjusted appeasement scores.

The online concierge system 140 may further adjust the adjusted appeasement score of the candidate item based on the appeasement scores of other candidate items in the set of candidate items. For example, the online concierge system 140 may normalize the adjusted appeasement scores for the set of candidate items such that each appeasement score falls between a range of 0 and 1.

The online concierge system 140 computes 340 a ranking score for each candidate item of the set of candidate items and ranks 345 the candidate items based on the ranking scores. The online concierge system 140 computes the ranking score for a candidate item based on the adjusted appeasement score of the candidate item. In some cases, the ranking score may simply be the adjusted appeasement score for the candidate item. The ranking score may also be based on other factors, such as a base score for the candidate item (e.g., a base score computed by the content presentation module 210) that represents an affinity of the user for the candidate item. The ranking score may be a product or linear combination of these factors. For example, the online concierge system 140 may compute the ranking score according to Equation 3, $$\text{ranking score} = \text{base score} \,(1 - \text{adjusted appeasement score}), \quad \text{Eq. 3}$$

where the adjusted appeasement score lies between 0 and 1. Further details of computing a ranking score based on the adjusted appeasement score are described with respect to FIGS. 4A and 4B.

The online concierge system 140 transmits 350 candidate items to the user for display based on the ranking. The online concierge system 140 may display candidate items that are higher in the ranking more prominently than items that are lower in the ranking. For example, the online concierge system 140 may display candidate items in the order of their rankings, with higher ranked candidate items (e.g., candidate items with higher ranking scores) at the top of the display.

The online concierge system 140 receives 355 a selection of one or more candidate items from the customer and adds 360 the selected one or more candidate items to the customer's order. The customer's order may include additional items, such as items selected by the user from search query results corresponding to a different search query. Responsive to receiving 365 a command from the user to place the order, the online concierge system 140 arranges for the order to be delivered to the location of the user. For example, the online concierge system 140 may select a picker to service the customer's order and transmit the order to a picker client device 110 associated with the picker.

Figure 4A:
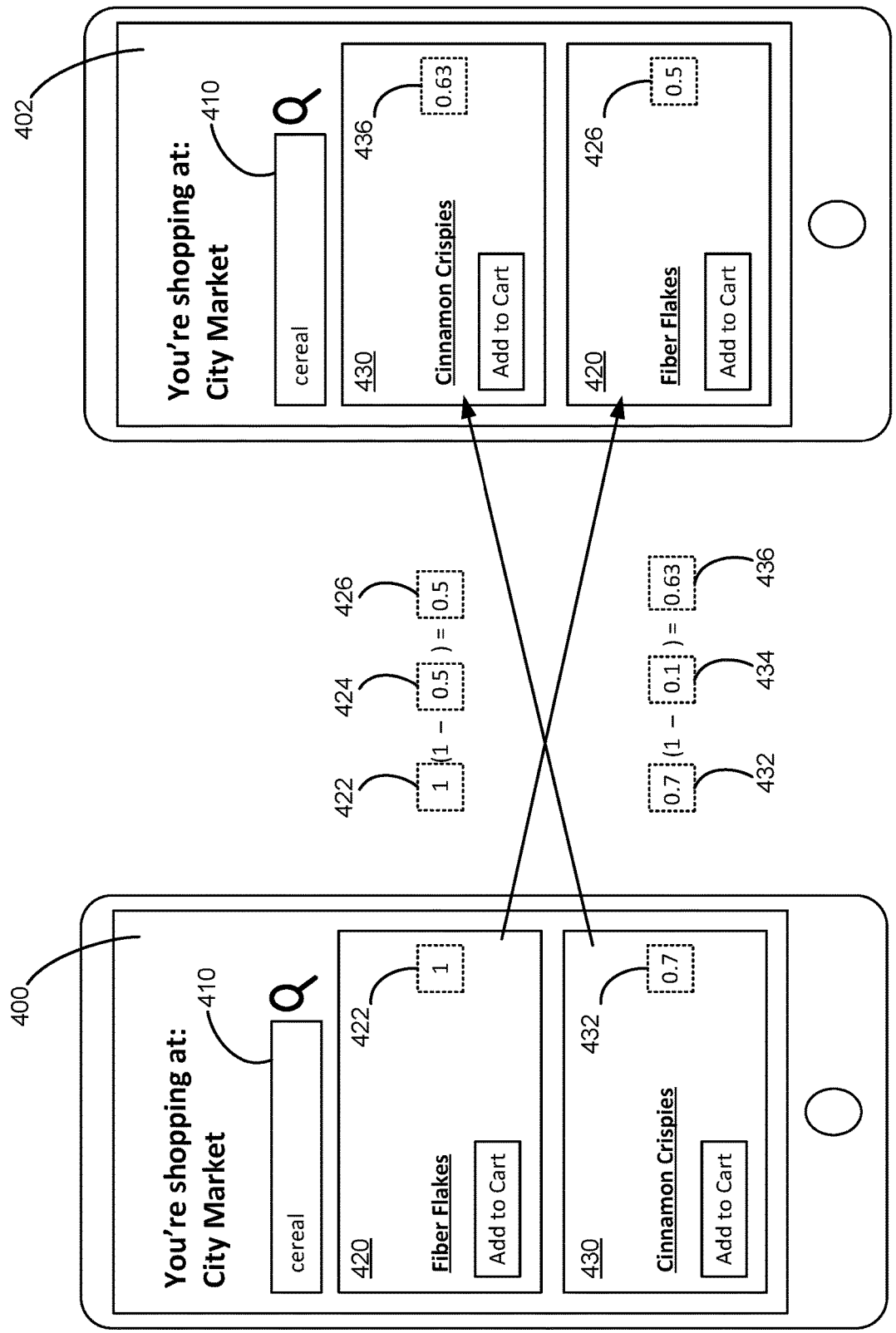
FIG. 4A illustrates adjusting the base score of an item by an appeasement score, in accordance with one or more embodiments.

FIG. 4A illustrates adjusting the base score of a candidate item by an appeasement score for the candidate item, in accordance with some embodiments. FIG. 4A shows two example user interfaces, an interface 400 and an interface 402. Both interfaces include a search query 410, "cereal," a candidate item 420, "Fiber Flakes," and a candidate item 430, "Cinnamon Crispies." Candidate item 420 has a base score 422 of 1 and an appeasement score 424 of 0.5. Candidate item 430 has a base score 432 of 0.7 and an appeasement score 434 of 0.1. The scores are shown in dotted boxes to represent that they are not features of the user interfaces.

In interface 400, the candidate items are ranked according to their base scores 422 and 432 without any consideration of their appeasement scores 424 and 434. As the base score 422 of 1 is higher than the base score 432 of 0.7, candidate item 420 is displayed higher up in interface 400 than candidate item 430.

In interface 402, the candidate items are ranked based on their ranking scores 426 and 436, calculated based on the Equation 3, where the "adjusted appeasement score" in the equation is simply the appeasement score 424 or 434 for the candidate item. Candidate item 420 has a ranking score 426 of 0.5. Candidate item 430 has a ranking score of 0.63. As the ranking score 426 of 0.5 is lower than the ranking score 436 of 0.63, candidate item 420 is displayed lower than candidate item 430, despite having a higher base score.

Figure 4B:
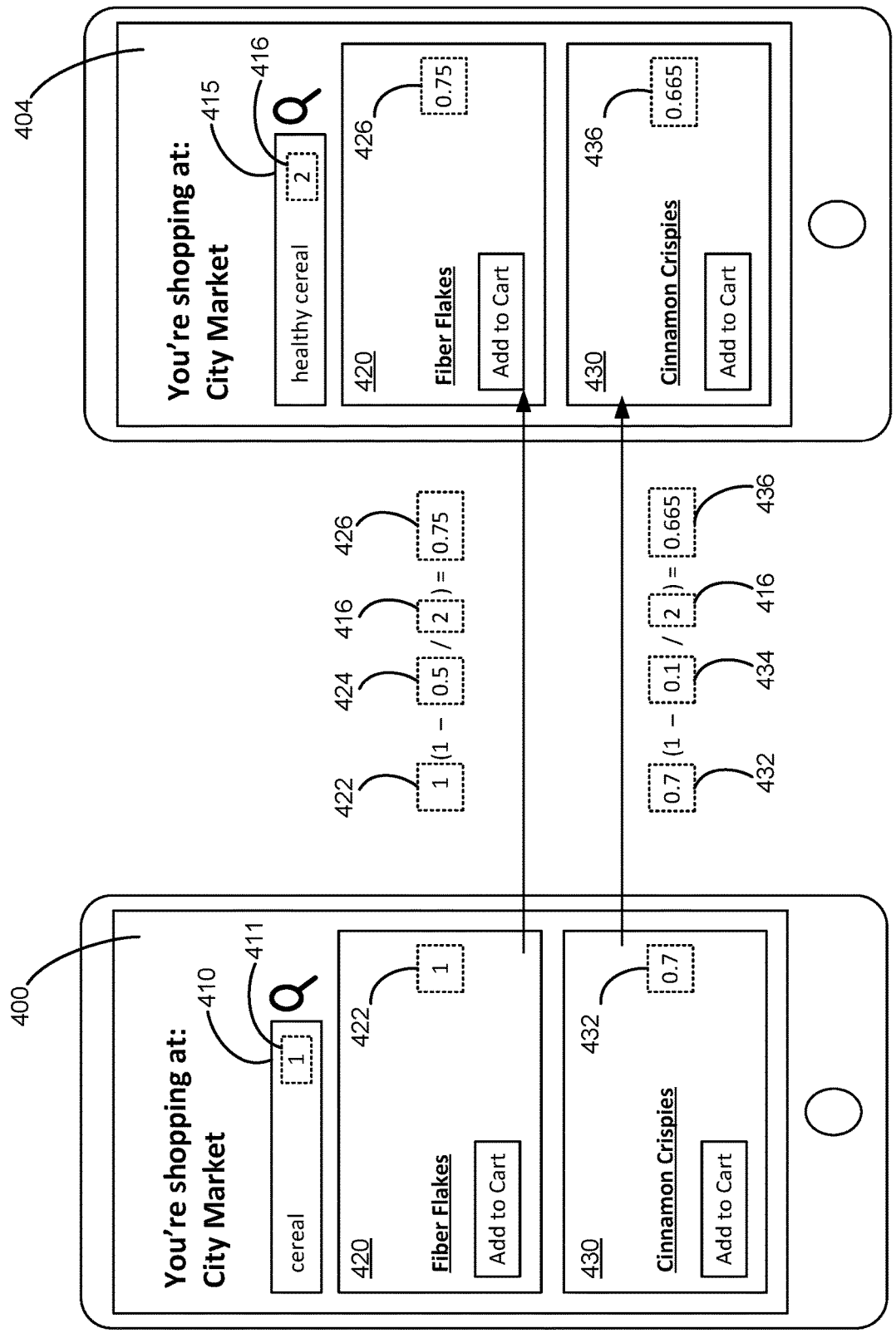
FIG. 4B illustrates adjusting the base score of an item by an appeasement score adjusted by a query specificity score, in accordance with one or more embodiments.

FIG. 4B illustrates adjusting the base score of a candidate item by an appeasement score adjusted by a query specificity score, in accordance with some embodiments. FIG. 4B shows two example user interfaces, an interface 400 and an interface 404. Interface 400 is the same as in FIG. 4A, showing search query 410, "cereal," as well as the candidate items 420/430 with respective base scores 422/432 and appeasement scores 424/434. Interface 404 includes search query 415, "healthy cereal," also including candidate items 420/430 with respective base scores 422/432 and appeasement scores 424/434. Note that in this example, the base scores 422 and 432 are the same for the different search queries 410 and 415, though in actuality a candidate item's base score may vary between different search queries. Also shown are query specificity scores 411 and 416 that correspond to the search queries 410 and 415. In this example, the search query 410, "cereal," has a query specificity score of 1 and the search query 415, "healthy cereal," has a query specificity score of 2, where the higher specificity score corresponds to a more specific search query.

Like in FIG. 4A, in interface 400 the candidate items are ranked according to their base scores 422 and 432 without any consideration of their appeasement scores 424 and 434. As the base score 422 of 1 is higher than the base score 432 of 0.7, candidate item 420 is displayed higher up in interface 400 than candidate item 430.

In interface 404, the candidate items are ranked based on their ranking scores 426 and 436, calculated based on Equation 3. The "adjusted appeasement score" in Equation 3 is calculated based on the appeasement score 424 or 434 for the candidate item and the query specificity score 416 of the search query 415 (e.g., the appeasement score divided by the query specificity score). In this example, for more specific queries, the query specificity score serves to lessen the penalty imposed by the appeasement score on the ranking score. Namely, as the query specificity increases, the "adjusted appeasement score" of Equation 3 decreases, causing the ranking score to be closer to the base score. The result of the adjustments leaves candidate item 420 with a ranking score 426 of 0.75 and candidate item 430 with a ranking score of 0.665. As the ranking score 426 of 0.75 is higher than the ranking score 436 of 0.665, candidate item 420 is displayed higher than candidate item 430 in interface 404.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method for displaying candidate items based on ranking scores, performed at a computer system comprising a processor and a computer-readable medium, comprising:
receiving a query from a user device corresponding to a user of an online system, wherein the query includes free text;
computing a query specificity score for the query, wherein the query specificity score represents an estimated breadth of the query relative to a diversity of an item database of the online system;
accessing a set of candidate items from the item database;
computing a base score for each candidate item in the set of candidate items, wherein the base score represents an affinity of the user for the candidate item;
computing an appeasement score for each candidate item in the set of candidate items based on appeasement data for the candidate item, wherein the appeasement score represents a likelihood that the user will request that an appeasement action be applied for the candidate item, and wherein the appeasement data describes past instances where an appeasement action was applied for the candidate item;
adjusting the appeasement score for each of the candidate items based on the query specificity score for the received query;
computing a ranking score for each candidate item in the set of candidate items based on the base score for the candidate item and the adjusted appeasement score for the candidate item;
ranking the candidate items based on the ranking scores;
transmitting the set of candidate items for display on the user device, wherein the candidate items are displayed in an order based on the ranking;
receiving, from the user device, a selection of a candidate item of the set of candidate items;
transmitting, to a picker device, an instruction to provide the selected candidate item to the user;
receiving, from the picker device, a confirmation that the selected candidate item was provided to the user;
receiving, from the user device, a request that an appeasement action be applied for the selected candidate item;
applying the appeasement action for the selected candidate item; and
updating the appeasement data for the selected candidate item stored in an appeasement database.

2. The method of claim 1, wherein computing the query specificity score for the query comprises:
obtaining item conversion counts of items resulting from the query as applied to the item database;
computing item entropies for the items as a function of the item conversion counts; and combining the item entropies to generate a query entropy.

3. The method of claim 1, wherein accessing a set of candidate items comprises:
filtering a set of possible items based on item availability to generate the set of candidate items.

4. The method of claim 1, wherein computing the appeasement score comprises:
computing the appeasement score based on an appeasement sensitivity of the user.

5. The method of claim 1, wherein computing the appeasement score comprises:
computing the appeasement score based on an appeasement rate.

6. The method of claim 1, wherein computing the appeasement score comprises:
predicting a likelihood that an appeasement action will be applied for the candidate item by using a machine learning model trained to receive the candidate item as input and to output the likelihood that an appeasement action will be applied for the candidate item.

7. The method of claim 1, wherein transmitting the set of candidate items for display on the user device based on the ranking comprises:
transmitting candidate items with higher rankings for display at a top of a display of the user device.

8. The method of claim 1, wherein computing the ranking score for each candidate item in the set of candidate items comprises:
computing a product or a linear combination of the adjusted appeasement score and the base score for each candidate item.

9. The method of claim 6, wherein training the machine learning model comprises training on a set of training examples, where each training example comprises a candidate item labeled by a historical appeasement rate for the candidate item.

10. A non-transitory computer-readable medium storing instructions that, when executed by a processor, cause the processor to perform steps comprising:
receiving a query from a user device corresponding to a user of an online system, wherein the query includes free text;
computing a query specificity score for the query, wherein the query specificity score represents an estimated breadth of the query relative to a diversity of an item database of the online system;
accessing a set of candidate items from the item database;
computing a base score for each candidate item in the set of candidate items, wherein the base score represents an affinity of the user for the candidate item;
computing an appeasement score for each candidate item in the set of candidate items based on appeasement data for the candidate item, wherein the appeasement score represents a likelihood that the user will request that an appeasement action be applied for the candidate item, and wherein the appeasement data describes past instances where an appeasement action was applied for the candidate item;
adjusting the appeasement score for each of the candidate items based on the query specificity score for the received query;
computing a ranking score for each candidate item in the set of candidate items based on the base score for the candidate item and the adjusted appeasement score for the candidate item;
ranking the candidate items based on the ranking scores;
transmitting the set of candidate items for display on the user device, wherein the candidate items are displayed in an order based on the ranking;
receiving, from the user device, a selection of a candidate item of the set of candidate items;
transmitting, to a picker device, an instruction to provide the selected candidate item to the user;

receiving, from the picker device, a confirmation that the selected candidate item was provided to the user;

receiving, from the user device, a request that an appeasement action be applied for the selected candidate item;

applying the appeasement action for the selected candidate item; and updating the appeasement data for the selected candidate item stored in an appeasement database.

11. The computer-readable medium of claim 10, wherein computing the query specificity score for the query comprises:

obtaining item conversion counts of items resulting from the query as applied to the item database;

computing item entropies for the items as a function of the item conversion counts; and combining the item entropies to generate the query entropy.

12. The computer-readable medium of claim 10, wherein accessing a set of candidate items comprises:

filtering a set of possible items based on item availability to generate the set of candidate items.

13. The computer-readable medium of claim 10, wherein computing the appeasement score comprises:

computing the appeasement score based on an appeasement sensitivity of the user.

14. The computer-readable medium of claim 10, wherein computing the appeasement score comprises:

computing the appeasement score based on an appeasement rate.

15. The computer-readable medium of claim 10, wherein computing the appeasement score comprises:

predicting a likelihood that an appeasement action will be applied for the candidate item by using a machine learning model trained to receive the candidate item as input and to output the likelihood that an appeasement action will be applied for the candidate item.

16. The computer-readable medium of claim 10, wherein transmitting the set of candidate items for display on the user device based on the ranking comprises:

transmitting candidate items with higher rankings for display at a top of a display of the user device.

17. The computer-readable medium of claim 15, wherein training the machine learning model comprises:

training on a set of training examples, where each training example comprises a candidate item labeled by a historical appeasement rate for the candidate item.

18. A system comprising:

a processor; and a non-transitory computer-readable medium storing instructions that, when executed by a processor, cause the processor to perform steps comprising:

receiving a query from a user device corresponding to a user of an online system, wherein the query includes free text;

computing a query specificity score for the query, wherein the query specificity score represents an estimated breadth of the query relative to a diversity of an item database of the online system;

accessing a set of candidate items from the item database;

computing a base score for each candidate item in the set of candidate items, wherein the base score represents an affinity of the user for the candidate item;

computing an appeasement score for each candidate item in the set of candidate items based on appeasement data for the candidate item, wherein the appeasement score represents a likelihood that the user will request that an appeasement action be applied for the candidate item, and wherein the appeasement data describes past instances where an appeasement action was applied for the candidate item;

adjusting the appeasement score for each of the candidate items based on the query specificity score for the received query;

computing a ranking score for each candidate item in the set of candidate items based on the base score for the candidate item and the adjusted appeasement score for the candidate item;

ranking the candidate items based on the ranking scores;

transmitting the set of candidate items for display on the user device, wherein the candidate items are displayed in an order based on the ranking;

receiving, from the user device, a selection of a candidate item of the set of candidate items;

transmitting, to a picker device, an instruction to provide the selected candidate item to the user;

receiving, from the picker device, a confirmation that the selected candidate item was provided to the user;

receiving, from the user device, a request that an appeasement action be applied for the selected candidate item;

applying the appeasement action for the selected candidate item; and updating the appeasement data for the selected candidate item stored in an appeasement database.

19. The system of claim 18, wherein the instructions for computing the query specificity score for the query comprise instructions that cause the processor to:

obtain item conversion counts of items resulting from the query as applied to the item database;

compute item entropies for the items as a function of the item conversion counts; and combine the item entropies to generate the query entropy.

* * * * *